United States Patent Office 3,037,821
Patented June 5, 1962

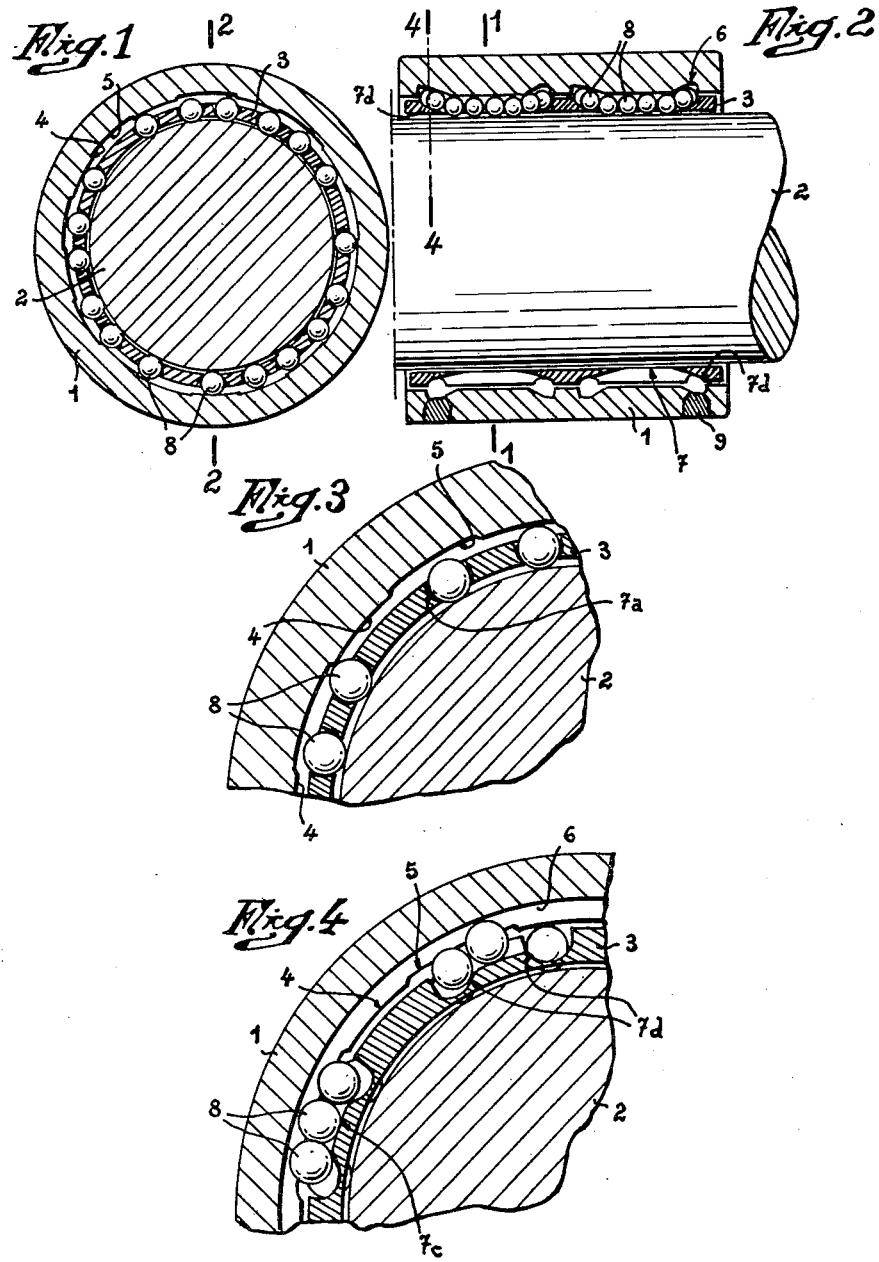

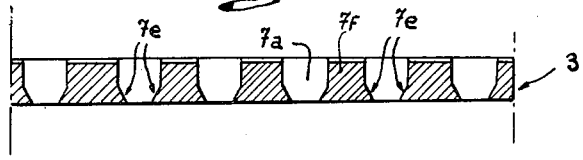
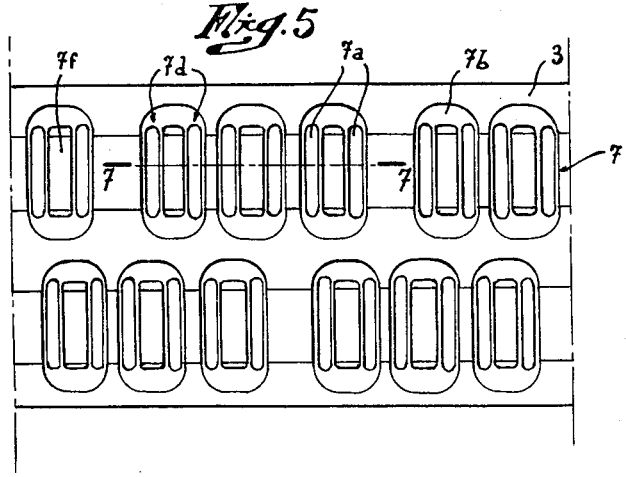
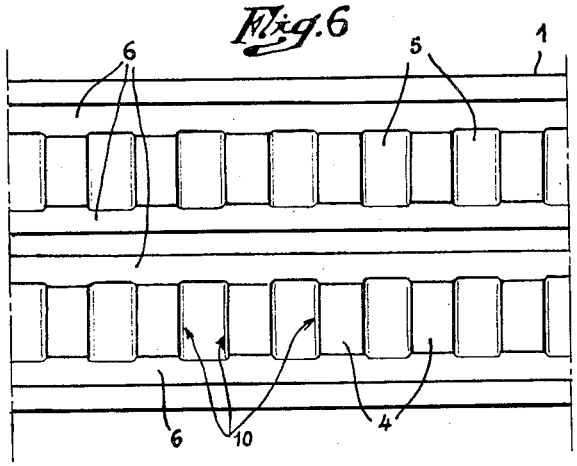

3,037,821
ROLLER BEARINGS FOR MEMBERS EXECUTING LONGITUDINAL AND ROTARY MOVEMENTS OF AN UNLIMITED AMPLITUDE
Charles Henri Schutz, 51 Rue Nicolas Garnier, Villeurbanne, France
Filed Sept. 9, 1960, Ser. No. 55,016
Claims priority, application France Sept. 15, 1959
8 Claims. (Cl. 308—6)

The present invention relates to improvements in roller bearings.

My invention has for its object a particular design of roller bearing, which allows both longitudinal movements of any amplitude and rotary movements, said rotary and longitudinal movements being produced simultaneously or otherwise. I resort for this purpose to balls guided, as known per se, inside a cage inserted between two members such as a central rod or upright and an outer race.

In known arrangements balls are fitted in a tubular cage adapted to move with reference to the race during the longitudinal movements so that such a type of bearings is limited to longitudinal movements of a reduced amplitude and, furthermore, does not ensure the desired fluidtightness of the bearing.

My invention eliminates these drawbacks and allows, longitudinal movement of any amplitude, while adapted for cooperation with fluidtight packings or terminal flanges.

According to the main feature of my invention, the cage of the bearing is provided along its periphery with a succession of grooves each forming a closed runway for the balls housed therein, the said balls moving therein in either direction, while means are provided, so that only the balls moving in one axial direction engage simultaneously the two members between which the rolling movement is ensured, say an upright and an outer race coaxial therewith.

According to a further feature of my invention, the closed runways containing the balls moving in a closed circuit are angularly distributed on the cage according to an irregular division rather than to a regular division, so that in the most unfavourable case there are at least three balls ensuring the contact, substantially at 120°, on a transverse section, while in the most favourable case the number of contacts equals that of the ball runways; of course, between these two extreme cases all the intermediary numbers of contacts may occur.

The cage may comprise several rows of ball runways, in which case these rows are all identical but angularly shifted in order that to a minimum position of three contacts in one of said rows corresponds a maximum number of contacts in the adjacent row.

According to a still further feature of my invention, each of the closed runways on the cage includes two rectilinear sections opening into both surfaces of the cage and connected with each other by two rounded slopes opening into only one of the surfaces of the race, said slopes facing annular grooves formed in the race, whereby the balls, when reaching said slopes, are raised by them and engage partly the corresponding groove in the outer race.

According to still further features, all the runways in one cage have the same breadth which corresponds to a dividing angle, such breadth or dividing angle being limited by the position of the two parallel rectilinear sections of a runway; in the case of the rectilinear shiftings effected in the race as well as in the case of those effected on the periphery of the upright, the angle defined by the breadth of each rectilinear shifting is greater that the dividing angle of a runway; and the angle defined by the breadth of the bearing surfaces or cylinder portions is smaller than the dividing angle of a runway.

My invention will be readily understood from the reading of the following disclosure, reference being made to the accompanying drawings illustrating a preferred embodiment of the invention given by way of example. In said drawings:

FIG. 1 is a cross-section through line 1—1 of FIG. 2;
FIG. 2 is a longitudinal section thereof through line 2—2 of FIG. 1;
FIG. 3 shows, on a larger scale, a fraction of FIG. 1;
FIG. 4 is a cross-section, also on a larger scale, through line 4—4 of FIG. 2;
FIG. 5 is a partial development of the cage;
FIG. 6 is a partial development of the race;
FIG. 7 illustrates, on a larger scale, a cross-section of the cage through line 7—7 of FIG. 5.

In said drawings, 1 designates the outer race, 2 the rod, upright or inner member and 3 the cage fitted between said race and said upright.

In the embodiment illustrated by the drawings, the rod or upright 2 shows no particular novel feature, but in a modification it may comprise the bearing surfaces 4 and the rectilinear recessed sections 5 shown on the race 1.

In the example shown in the drawings, the race 1 is provided with two rows of elementary bearing surfaces 4, separated from each other by receding or recessed sections 5. Said bearing surfaces 4 form portions of a cylinder which are ground and tempered. Each row of bearing surfaces and recessed sections is limited on either side by an annular groove 6.

The cage 3 is provided, in the same embodiment, with two rows of runways 7, each of which forms a closed circuit, as shown in FIG. 5 and includes two rectilinear sections 7a which are parallel and open into both surfaces of the cage to form an opening therethrough. Said rectilinear sections are interconnected by rounded sections 7b which do not open into the surface of the cage facing the upright, while the bottom 7c (FIG. 4) of each section 7b is provided with a sloping inlet and outlet 7d leading to the corresponding rectilinear section, each slope registering transversely with one of the annular grooves 6 in the race 1. The rectilinear sections 7a are provided along their edges facing the upright with bevelled edges 7e (FIG. 7).

The balls 8 are held fast in said runways and move consequently along closed circuits. They are inserted in said runways through ports formed in the race 1, which ports are then closed by plugs 9.

The length of the upright 2 depends on the amplitude of the longitudinal movement required, which amplitude can be selected without any limitation.

The receding sections 5 are connected to the bearing surfaces 4 by slopes 10 (FIG. 6).

It is thus apparent that, when there is obtained a relative longitudinal and/or rotary movement between the race 1 and the upright 2, the balls 8 roll round their centers and move along their runways 7. Those balls moving in the direction of said relative movement register at least over part of the runways 7 with one of the bearing surfaces 4 on the race 1 and they ensure thus a rolling without any clearance between the race and the upright; in contradistinction, the balls moving against the direction of said relative movement register with one of the recesses 5 and are therefore not in contact with the race 1.

As shown in FIG. 5, the distribution of the ball runways is not exactly angular. They are distributed in the row in such a way that as a minimum three runways are in contact, substantially at 120°, with the bearing surfaces 4 of the race, with the number of contacts continually varying from said minimum to the maximum where all the runways are in contact.

In the case (FIG. 5) of two rows of runways distributed over the length of the cage, the runways of one of said rows are angularly off-set with respect to those of the other row so that, at a given instant when there is a minimum number of contacts (three contacts) in one of the rows a maximum number of contacts is in the other row.

When moving in said runways, the balls pass from one rectilinear section 7a to the other and they rise on one side along the slopes 7d, so as to engage over part of their periphery the corresponding circular grooves 6 in the race 1; said partial engagement of the balls in the grooves 6 provides, on the one hand, the correct positioning of the cage 3 with reference to the outer cage 1 and, on the other hand, these slopes ensure a unitary structure for the cage, since the solid inner section 7f of each runway is connected with the remainder of the cage through said slopes.

The fact that the cage 3 does not move longitudinally with reference to the outer race 1 allows fitting a fluidtight packing or flange at the outer ends of the cage.

Moreover, the special features of the roller bearing of the invention are advantageous in permitting it to work with very little wear, owing to the fact that the number of balls in use is great, that there are very few chances that the balls pass on the same points of the upright or the race, and also that the recessed sections in the race can be made very shallow and are connected to the bearing surfaces by slopes providing an even and smooth operation.

Obviously, and as apparent from the preceding disclosure, my invention is by no means limited to the embodiment described and it covers all the modifications thereof falling within the scope of the accompanying claims, the number of rows of runways formed on the cage 3 and the corresponding number of bearing surfaces and recessed sections on the race 1 or on the upright 2 being irrelevant.

What I claim is:

1. A roller bearing comprising an inner upright member, a race element surrounding said upright member, a cage element between said race element and said upright member, said cage element being provided with a plurality of closed runways, said runways having passageways extending lengthwise of said cage element and curved end portions connecting said passageways, a plurality of balls in said runways, the race element being provided with regularly spaced alternating raised and recessed portions facing said cage element, the runways being irregularly spaced along the periphery of the cage element so that the balls in one of the passageways in at least one of the runways engages one of the raised portions of the race element, said cage element rotating with respect to the race element with said upright member rotating with respect to said race element, and the balls circulating in at least said one runway with said upright member being axially displaced with respect to said race element.

2. A roller bearing comprising an inner upright member, a race element surrounding said upright member, a cage element between said race element and said upright member, the cage element being rotatably supported in said race element, said cage element having a closed runway therein providing passageways extending lengthwise of said cage element and curved end portions connecting said passageways, a plurality of balls in said runway, the race element having a raised and recessed portion, the balls in one of said passageways contacting the raised portion of the race element, the balls circulating in said closed runway with said upright member and cage element having relative axial movement and the balls in said passageways alternatingly contacting the raised portion of the race element with said elements rotating with respect to one another.

3. A bearing as claimed in claim 1 wherein said runways are angularly spaced around the periphery so that the balls in at least three lengthwise runways engage the raised portions of the race element, said lengthwise runways being angularly spaced at about 120°.

4. A bearing as claimed in claim 1 wherein said recessed portions have a greater angular extent than that of said raised portions.

5. A bearing as claimed in claim 1 wherein said passageways extend through said cage element to form a slot therein, the curved portions only partially extending through said cage element and facing said race element, said race element being provided with annular grooves adjacent said curved portions, said curved portions being inclined with respect to said passageways whereby the balls are raised in said curved portions and penetrate into said groove.

6. A bearing as claimed in claim 3 wherein said cage element is provided with a plurality of identical rows of said runways which rows are angularly displaced with respect to one another.

7. A bearing as claimed in claim 4 wherein each said runway has passageways which are angularly spaced a distance which is less than that of said recessed portions of the race element.

8. A bearing as claimed in claim 4 wherein each said runway has passageways which are angularly spaced a distance which is greater than that of said raised portions of the race element.

References Cited in the file of this patent

UNITED STATES PATENTS

| | | |
|---|---|---|
| 2,516,486 | Schlicksupp | July 25, 1950 |
| 2,576,269 | Thomson | Nov. 27, 1951 |